Figure 1:
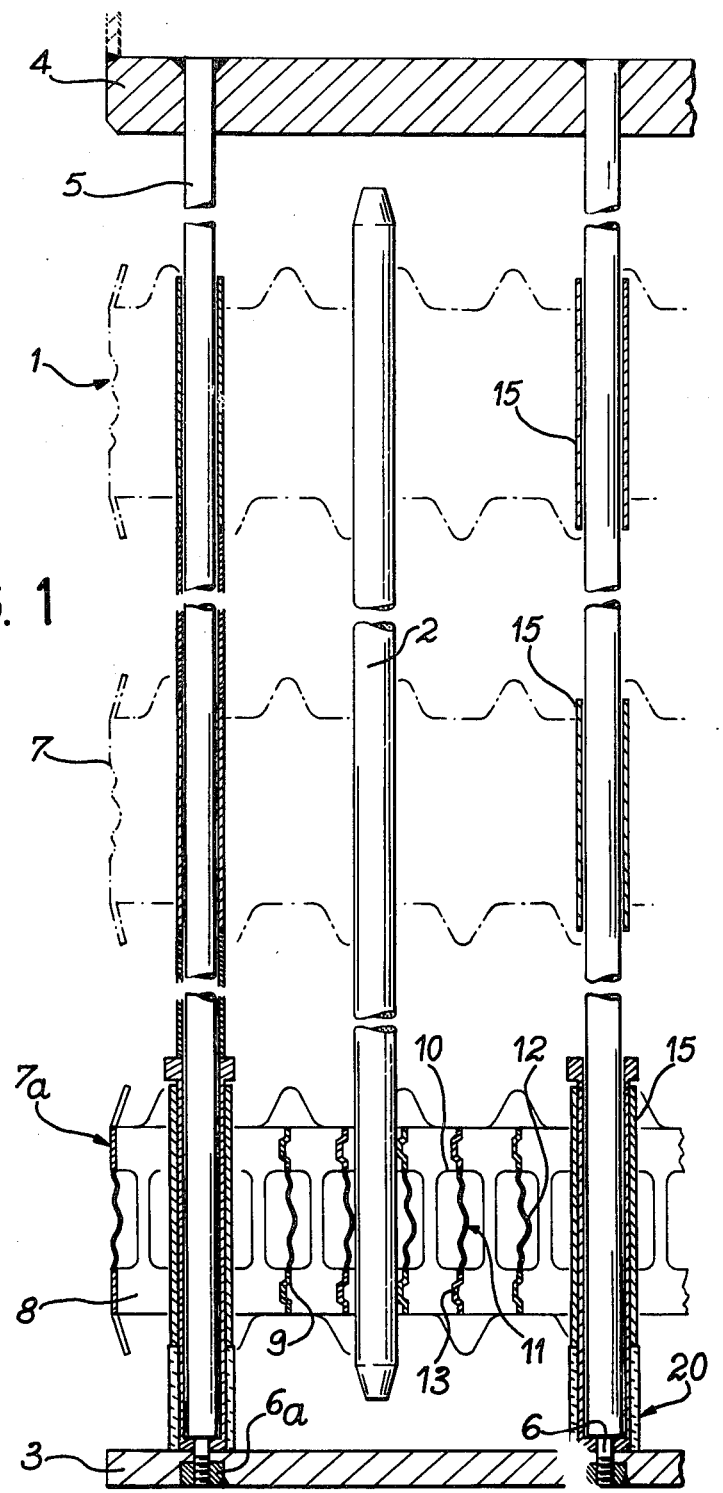

United States Patent [19]

Feutrel

[11] 4,364,901

[45] Dec. 21, 1982

[54] ANTI-FLY-OFF DEVICE

[75] Inventor: Claude Feutrel, Vauhallan, France

[73] Assignee: Commissariat a l'Energie Atomique, France

[21] Appl. No.: 181,705

[22] Filed: Aug. 27, 1980

[30] Foreign Application Priority Data

Sep. 6, 1979 [FR] France ............................ 79 22309

[51] Int. Cl.³ .............................................. G21C 3/34
[52] U.S. Cl. ..................................... 376/438; 376/445; 376/364
[58] Field of Search ................ 376/364, 365, 438–439, 376/445

[56] References Cited

U.S. PATENT DOCUMENTS

| | | | |
|---|---|---|---|
| 3,801,734 | 4/1974 | West ..................................... | 376/364 |
| 3,915,793 | 10/1975 | Andersson et al. .............. | 376/438 X |
| 3,997,394 | 12/1976 | Aisch et al. ....................... | 376/438 X |
| 4,061,536 | 12/1977 | Creagan et al. .................... | 376/439 |
| 4,104,120 | 8/1978 | Grubelich ........................ | 376/445 X |
| 4,208,248 | 6/1980 | Jabsen ............................. | 376/438 X |

Primary Examiner—Peter A. Nelson

[57] ABSTRACT

The present invention relates to an anti-fly-off device for the fuel element of a nuclear reactor.

This device, which is applicable to a nuclear reactor, comprises a plurality of sheathed fuel elements kept parallel to one another by a system of spacing grids and a stucture, independent of the fuel elements and formed by two parallel plates, namely an upper plate and a lower plate, between which extend brace rods regularly distributed among the system of fuel elements, whereby at least certain of these brace rods are surrounded by grid sleeves. A casing introduced into the grid sleeves of the lower grid around the brace rods and fixed by its lower end to the lower plate has at its upper end an outer shoulder which, with an appropriate clearance, blocks the upward displacement of the grid sleeve.

2 Claims, 2 Drawing Figures

ANTI-FLY-OFF DEVICE

The present invention relates to an anti-fly-off device for the fuel element of a nuclear reactor.

This device is particularly intended for an ordinary water nuclear reactor of the type having a plurality of sheathed fuel elements kept parallel to one another by a system of spacings grids and a rigid structure formed by two parallel plates, namely an upper plate and a lower plate between which extend brace rods regularly distributed among the system of fuel elements.

As is known in nuclear reactors of the type described hereinbefore under the action of the circulation of the liquid cooling medium flowing in contact with the fuel elements, the latter are subject to a vertically upwardly directed dynamic thrust which exceeds the weight of the assembly.

A number of devices have been proposed for preventing the fly-off of said fuel elements. For example, an anit-fly-off device is known in which the lower grid has long sleeves resting on the base plate which are welded into its structure. Displacements of the grid are prevented by corrugations made on the guide tube and on the sleeve.

In particular, French Pat. No. 7,714,754 filed on May 13th 1977 by the Commissariat a l'Energie Atomique and entitled "Nuclear fuel assembly" discloses a system of spacing grids for fuel elements of nuclear reactors making it possible to adapt to all deformations under irradiation both of the grids, the brace rods and the fuel elements. The weight of the latter is regularly distributed over the lower plate of the structure due to tubular spacers surrounding the bottom of the brace rods. However, this said construction does not prevent the fly-off of the fuel assembly under the effect of the dynamic pressure resulting from the flow of the liquid cooling medium in contact with the fuel elements.

The present invention relates to an anit-fly-off device which obviates the disadvantages of the construction described hereinbefore, whilst retaining the advantages thereof. This device makes it possible to prevent the fly-off of fuel elements under the action of the circulation of the liquid cooling medium in contact therewith, whilst making it possible to retain the advantages of a regular distribution of the weight of the assembly on the lower plate and of a free upward expansion of the fuel elements.

Therefore, the present invention relates to an anti-fly-off device for the fuel element of a nuclear reactor, whereby the latter has a plurality of sheathed fuel elements kept parallel to one another by a system of spacing grids and a structure, independent of the fuel elements, formed by two parallel plates, namely an upper plate and a lower plate between which extend brace rods regularly distributed among the system of fuel elements, whereby grid sleeves surround at least some of the brace rods, wherein a casing introduced into the grid sleeves of the lower grid around the brace rods and whose lower end is fixed to the lower plate has at its upper end an outer shoulder which prevents the upward displacement of the grid sleeve and consequently of the lower grid and the fuel assembly system.

The invention is described in greater detail hereinafter relative to non-limitative embodiments and the attached drawings, wherein show:

FIG. 1 an overall view of a nuclear reactor fuel element supporting structure incorporating an anti-fly-off device according to the invention.

Figure 2:
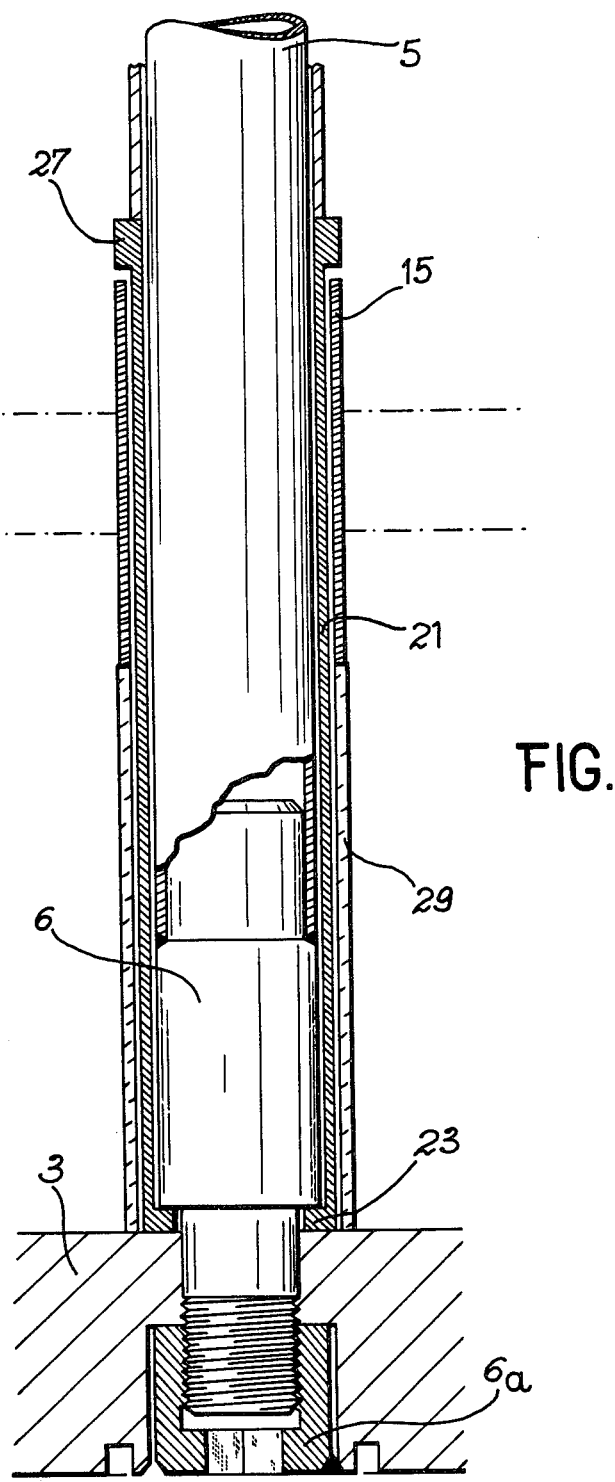

FIG. 2 a detailed view of the anti-fly-off device.

As is apparent from FIG. 1, the diagrammatically shown fuel assembly is designated overall by the reference numeral 1. It comprises a plurality of vertically axed, sheathed fuel elements 2, which are parallel to one another. The group of fuel elements is mounted between two horizontal plates, respectively a lower plate 3 and an upper plate 4, which are spaced by means of a series of brace rods 5, appropriately distributed in the group of fuel elements 2, whilst more particularly occupying certain of the junction points of said system. Advantageously, there are twenty four brace rods 5 and have a diametral dimension close to that of the fuel elements.

The ends of the brace rods 5 are fixed to the end plates, namely lower plate 3 and upper plate 4 in order to form a rigid structure. To this end, each of the brace rods 5 has a threaded end fitting 6. A nut 6a locks the end fitting on lower plate 3 making the brace rod 5 integral with the latter.

The geometry of the system of fuel elements 2 is maintained with respect to the brace rods 5 by means of parallel grids 7 positioned at appropriate intervals in the lengthwise direction of the fuel elements. In per se known manner, each of the grids is formed by two groups of metal sheaths 8 and 9 extending in two perpendicular directions in order to define between them a series of square cavities, each traversed by one of the fuel elements 2 of the group. The grids 7 are rendered integral with these fuel elements by an elastic supporting link. To this end, the plates 8 and 9 of the grids contain central slots 10, whose upper and lower end edges are connected by undulated strips 11, whose median portion has a projecting edge 12 which can come into contact with the fuel element 2 traversing the corresponding cavity. The upper and lower parts of the plates 8 and 9 also have bosses 13 on which bear the fuel elements 2 which are moved against these bosses by strips 11. These arrangements make it possible to appropriately maintain the grids 7 with respect to the group of fuel elements 2, whilst ensuring a possible sliding connection between said members. As a result of these connections, the grids 7 are rendered integral with the group of fuel elememts 2 and follow the latter in their displacements caused by the differential expansions, whilst on the other hand sliding relative to the brace rods 5.

Each grid 7, which maintains and supports the group of fuel elements 2 by supporting members 11 and 13 has at the passage point of the brace rods 5 a grid sleeve 15 which is welded to the grid and is freely traversed with an appropriate clearance by the corresponding brace rod. The thus obtained supporting sytructure makes it possible to adapt to all deformations under irradiation, both of the grids, the brace rods and the fuel elements. However, said assembly is subject to an upward vertical dynamic pressure under the action of the circulation of the liquid cooling medium of the nuclear reactor. The anti-fly-off device 20 according to the present invention limits the upward displacement of lower grid 7a. A detailed view of this anit-fly-off device is shown in FIG. 2.

The anit-fly-off device according to the invention comprises a casing 21 introduced into the grid sleeve 15 of lower grid 7a around the brace rods 5. The casing 21 has at its lower end an inner shoulder 23, which is locked between end fitting 6 of brace rod 5 and lower plate 3. At its upper end, the casing 21 has an outer shoulder 27 which, with an appropriate clearance, blocks the upward displacement of the grid sleeve 15. This prevents the upward displacement of the lower grid 7a and consequently of the fuel assembly construction, in view of the large number of elastic links of each of said grids 7 with fuel elements 2.

The lower grid 7a rests on a series of tubular spacers 29 surrounding the anit-fly-off casing 21 and extending between the grid sleeves 15 of lower grid 7a and lower plate 3. Thus, the weight of the group of fuel elements rests directly on the lower plate 3 and is also distributed over the latter, without additionally stressing the brace rods 5. In addition, the fuel elements 2 can freely expand.

Thus, the anti-fly-off device according to the invention prevents the upward displacement of the system constituted by grids 7 and fuel elements 2, whilst retaining the advantages of a free expansion of the fuel elements and a regular distribution of the weight of the assembly on the lower plate 3.

Moreover, the configuration of the anti-fly-off casing makes it possible for the lower grid to be identical to the other grids, which is an economic advantage.

I claim:

1. A nuclear fuel assembly comprising a bundle of sheathed fuel elements maintained in parallel relation in a uniform lattice by means of an array of separate spacing grids fitted with elements for providing resilient application of said grids against said fuel elements, and a rigid structure which is independent of the fuel elements and formed by two parallel upper and lower end plates between which extend brace rods disposed at uniform intervals at the nodes of the fuel element lattice, at least some of the brace rods being surrounded by grid sleeves connected to said grids and sliding along said brace rods and the lower grid resting on a system of spacers extending between the lower plate and the grid sleeves of said lower grid, wherein a casing is introduced in the grid sleeves of the lower grid around the brace rods, said casing having a lower end and an upper end, said lower end being fixed to the lower plate, and said upper end having an outer shoulder which prevents the upward displacement of the associated grid sleeve and consequently of the lower grid and the fuel assembly system.

2. A nuclear fuel assembly according to claim 1, wherein each of the brace rods is terminated by an end fitting fixed to the lower plate, said casing having at its lower end an inner shoulder locked between the lower plate and the end fitting of the brace rod.

* * * * *